US012581449B2

(12) United States Patent
Li et al.

(10) Patent No.: US 12,581,449 B2
(45) Date of Patent: Mar. 17, 2026

(54) POSITIONING METHOD AND APPARATUS, AND TERMINAL AND DEVICE

(71) Applicant: DATANG MOBILE COMMUNICATIONS EQUIPMENT CO., LTD., Beijing (CN)

(72) Inventors: Hui Li, Beijing (CN); Ren Da, Beijing (CN); Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 387 days.

(21) Appl. No.: 18/033,929

(22) PCT Filed: Oct. 26, 2021

(86) PCT No.: PCT/CN2021/126474
§ 371 (c)(1),
(2) Date: Apr. 26, 2023

(87) PCT Pub. No.: WO2022/089442
PCT Pub. Date: May 5, 2022

(65) Prior Publication Data
US 2024/0031973 A1 Jan. 25, 2024

(30) Foreign Application Priority Data
Oct. 27, 2020 (CN) .......................... 202011168407.7

(51) Int. Cl.
*H04W 64/00* (2009.01)
*G01S 5/00* (2006.01)
(Continued)

(52) U.S. Cl.
CPC ........... *H04W 64/00* (2013.01); *G01S 5/0063* (2013.01); *G01S 5/021* (2013.01); *G01S 5/0268* (2013.01);
(Continued)

(58) Field of Classification Search
CPC ..... H04W 64/00; H04W 4/025; H04W 24/08; G01S 5/0063; G01S 5/021; G01S 5/0268;
(Continued)

(56) References Cited

U.S. PATENT DOCUMENTS 9,769,621 B2* 9/2017 Xiao ...................... G01S 5/0236
10,218,471 B1 2/2019 Kumar et al.
(Continued)

FOREIGN PATENT DOCUMENTS

CN 101019347 A 8/2007
CN 102461292 A 5/2012
(Continued)

OTHER PUBLICATIONS

"FL Summary for Potential Positioning Enhancements" CATT, 3GPP TSG RAN WG1 Meeting #103-e, R1-2009314, Oct. 26, 2020.
(Continued)

*Primary Examiner* — Kabir A Timory
(74) *Attorney, Agent, or Firm* — Ladas & Parry, LLP

(57) ABSTRACT

Embodiments of this disclosure provide a positioning method and apparatus, and terminal and device. The method performed by a terminal includes: receiving positioning configuration information, wherein the positioning configuration information includes at least one of positioning reference signal configuration information or a first frequency layer error parameter; calculating a positioning measurement quantity according to the positioning configuration information; reporting the positioning measurement quantity to a positioning server; wherein the positioning measurement quantity is reported in the following manner: one positioning measurement quantity is reported for multiple frequency layers of one transmission and reception point (TRP), or one positioning measurement quantity is reported
(Continued)

for each frequency layer of one TRP. With the disclosed solution, a more accurate positioning measurement quantity may be obtained, thus the positioning of the terminal is more accurate and positioning accuracy is improved.

18 Claims, 5 Drawing Sheets

(51) Int. Cl.
    *G01S 5/02*          (2010.01)
    *H04L 5/00*          (2006.01)
(52) U.S. Cl.
    CPC ...... *H04L 5/0051* (2013.01); *G01S 2205/008*
                                                    (2013.01)
(58) Field of Classification Search
    CPC ............. G01S 2205/008; G01S 5/0036; G01S
                                        5/0236; H04L 5/0051
    See application file for complete search history.

(56)                    References Cited

U.S. PATENT DOCUMENTS

| | | | |
|---|---|---|---|
| 2005/0090278 | A1 | 4/2005 | Jeong et al. |
| 2006/0035645 | A1 | 2/2006 | Kim |
| 2006/0058047 | A1 | 3/2006 | Jeong et al. |
| 2010/0317343 | A1 | 12/2010 | Krishnamurthy et al. |

| | | | | |
|---|---|---|---|---|
| 2015/0078154 | A1 | 3/2015 | Jain | |
| 2015/0078348 | A1 | 3/2015 | Han et al. | |
| 2015/0078349 | A1 | 3/2015 | He et al. | |
| 2017/0332342 | A1 | 11/2017 | Lu et al. | |
| 2018/0007576 | A1* | 1/2018 | Lee | H04L 5/0035 |
| 2018/0139763 | A1 | 5/2018 | Bitra et al. | |
| 2022/0095265 | A1 | 3/2022 | Cha et al. | |
| 2022/0166531 | A1 | 5/2022 | Ren et al. | |
| 2023/0020648 | A1* | 1/2023 | Cha | G01S 5/0036 |
| 2023/0239093 | A1* | 7/2023 | Si | H04W 72/0453 |
| | | | | 370/329 |

FOREIGN PATENT DOCUMENTS

| | | |
|---|---|---|
| CN | 104469930 A | 3/2015 |
| CN | 105474719 A | 4/2016 |
| CN | 109923842 A | 6/2019 |
| WO | 2020145700 A1 | 7/2020 |
| WO | 2020186959 A1 | 9/2020 |

OTHER PUBLICATIONS

Supplementary European Search Report in EP Application No. 21885169.9, issued on Aug. 20, 2024.
Office Action and search report from the corresponding Chinese Patent Application No. 202011168407.7 dated Nov. 21, 2022 and English translation.
PCT International Search Report and Written Opinion from PCT/CN2021/126474 dated Dec. 31, 2021, and its English translation.

* cited by examiner

POSITIONING METHOD AND APPARATUS, AND TERMINAL AND DEVICE

CROSS-REFERENCE TO RELATED APPLICATIONS

This application is the U.S. national phase of PCT Application No. PCT/CN2021/126474 filed on Oct. 26, 2021, which claims priority to Chinese Patent Application No. 202011168407.7 filed with CNIPA on Oct. 27, 2020 and titled "Positioning method and apparatus, and terminal and device", the disclosures of which are incorporated in their entireties by reference herein.

TECHNICAL FIELD

The present disclosure relates to the field of mobile communications technologies, in particular to a positioning method and apparatus, and terminal and device.

BACKGROUND

In a New Radio (NR) system, a terminal achieves downlink positioning by measuring positioning reference signals (PRSs) transmitted by multiple transmission and reception points (TRPs). Each terminal may measure PRSs transmitted by at most four frequency layers. Each frequency layer corresponds to one frequency bandwidth. It is specified in NR systems that each frequency layer includes a maximum of 276 physical resource blocks (PRBs), and the frequency-domain position thereof is configured by a positioning server to the terminal. In each frequency layer, multiple TRPs may be configured to transmit PRSs. Each TRP may configure a PRS resource set for transmitting multiple PRSs. Each PRS resource set may include multiple PRS resources. Multiple PRS resources in one PRS resource set may utilize different transmitting beams, to provide coverage of terminals.

A terminal measures PRSs transmitted by different TRPs of one frequency layer and then obtains positioning measurement values of the different TRPs. The terminal reports the positioning measurement values to a positioning server, and the positioning server calculates position information of the terminal.

Therefore, the positioning accuracy is related to the bandwidth of PRS. The greater the bandwidth, the higher its temporal resolution is and the higher the positioning accuracy is. In conventional positioning methods, the bandwidth of PRS is limited by the bandwidth of one frequency layer. These conventional positioning methods cannot meet the positioning accuracy demands of scenarios having higher positioning accuracy requirements (e.g., an industrial Internet of Things scenario).

SUMMARY

Embodiments of the present disclosure provide a positioning method and apparatus, and terminal and device, to solve the problem in the prior art of low positioning accuracy for terminals to some extent.

In a first aspect, an embodiment of the present disclosure provides a positioning method, performed by a terminal, including:

receiving positioning configuration information, wherein the positioning configuration information includes at least one of positioning reference signal (PRS) configuration information or a first frequency layer error parameter;

calculating a positioning measurement quantity according to the positioning configuration information; and reporting the positioning measurement quantity to a positioning server;

wherein the positioning measurement quantity is reported in the following manner: one positioning measurement quantity is reported for multiple frequency layers of one transmission and reception point (TRP), or one positioning measurement quantity is reported for each frequency layer of one TRP.

Optionally, prior to the receiving the positioning configuration information, the method further includes:

transmitting frequency layer aggregation capability information to the positioning server; and receiving frequency layer aggregation indication information transmitted by the positioning server.

Optionally, after the receiving the frequency layer aggregation indication information transmitted by the positioning server, the reporting the positioning measurement quantity to the positioning server includes:

reporting the positioning measurement quantity to the positioning server according to the frequency layer aggregation indication information.

Optionally, the frequency layer aggregation capability information includes at least one of: a quantity of aggregated frequency layers, whether frequency layer aggregation is supported, or a receiving filter bandwidth;

the frequency layer aggregation indication information includes: indication as to whether the terminal is to perform frequency layer aggregation, a frequency layer aggregation reporting manner, and indication of indexes of frequency layers for aggregation.

Optionally, in case that the positioning configuration information includes the first frequency layer error parameter and the PRS configuration information, the calculating the positioning measurement quantity according to the positioning configuration information includes:

compensating for errors in PRSs of different frequency layers according to the PRS configuration information and the first frequency layer error parameter, to obtain compensated PRSs; and calculating the positioning measurement quantity according to the compensated PRSs.

Optionally, after the receiving the positioning configuration information, the method further includes:

measuring PRSs of different frequency layers that are transmitted by a base station, to obtain measurement results;

obtaining a second frequency layer error parameter of the different frequency layers according to the measurement results; and transmitting the second frequency layer error parameter to the positioning server or the base station.

Optionally, the first frequency layer error parameter or the second frequency layer error parameter includes at least one of: a timing offset, a phase offset, a frequency error, or a power offset between the different frequency layers.

In a second aspect, an embodiment of the present disclosure further provides a positioning method, performed by a positioning server, including:

receiving positioning configuration information transmitted by a base station, and transmitting the positioning configuration information to a terminal, wherein the positioning configuration information includes at least one of PRS configuration information or a first frequency layer error parameter;

receiving a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and solving a position of the terminal according to the positioning measurement quantity, to obtain target position information of the terminal.

Optionally, the method further includes:

receiving frequency layer aggregation capability information transmitted by the terminal; and transmitting frequency layer aggregation indication information to the terminal according to the frequency layer aggregation capability information.

Optionally, the frequency layer aggregation capability information includes at least one of: a quantity of aggregated frequency layers, whether frequency layer aggregation is supported, or a receiving filter bandwidth.

Optionally, the frequency layer aggregation indication information includes: indication as to whether the terminal is to perform frequency layer aggregation, a frequency layer aggregation reporting manner, and indication of indexes of frequency layers for aggregation.

Optionally, after the transmitting the positioning configuration information to the terminal, the method further includes:

receiving a second frequency layer error parameter of different frequency layers that is transmitted by the terminal or the base station.

Optionally, the solving the position of the terminal according to the positioning measurement quantity to obtain the target position information of the terminal includes:

compensating for errors in the positioning measurement quantity according to the positioning measurement quantity and the second frequency layer error parameter, to obtain compensated positioning measurement quantity; and solving the position of the terminal according to the compensated positioning measurement quantity, to obtain the target position information of the terminal.

Optionally, the first frequency layer error parameter or the second frequency layer error parameter includes at least one of: a timing offset, a phase offset, a frequency error, or a power offset between the different frequency layers.

In a third aspect, an embodiment of the present disclosure further provides a terminal, including a memory, a transceiver and a processor, wherein the memory is configured to store a computer program, the transceiver is configured to transmit and receive data under the control of the processor, and the processor is configured to read the computer program in the memory to implement following steps:

receiving positioning configuration information, wherein the positioning configuration information includes at least one of PRS configuration information or a first frequency layer error parameter;

calculating a positioning measurement quantity according to the positioning configuration information; and reporting the positioning measurement quantity to a positioning server;

wherein the positioning measurement quantity is reported in the following manner: one positioning measurement quantity is reported for multiple frequency layers of one transmission and reception point (TRP), or one positioning measurement quantity is reported for each frequency layer of one TRP.

Optionally, prior to the receiving the positioning configuration information, the processor is further configured to read the computer program in the memory to implement following steps:

transmitting frequency layer aggregation capability information to the positioning server; and receiving frequency layer aggregation indication information transmitted by the positioning server.

Optionally, the frequency layer aggregation capability information includes at least one of: a quantity of aggregated frequency layers, whether frequency layer aggregation is supported, or a receiving filter bandwidth.

Optionally, the frequency layer aggregation indication information includes: indication as to whether the terminal is to perform frequency layer aggregation, a frequency layer aggregation reporting manner, and indication of indexes of frequency layers for aggregation.

Optionally, in case that the positioning configuration information includes the first frequency layer error parameter and the PRS configuration information, the calculating the positioning measurement quantity according to the positioning configuration information includes:

compensating for errors in PRSs of different frequency layers according to the PRS configuration information and the first frequency layer error parameter, to obtain compensated PRSs; and calculating the positioning measurement quantity according to the compensated PRSs.

Optionally, after the receiving the positioning configuration information, the processor is further configured to read the computer program in the memory to implement following steps:

measuring PRSs of different frequency layers that are transmitted by a base station, to obtain measurement results;

obtaining a second frequency layer error parameter of the different frequency layers according to the measurement results; and transmitting the second frequency layer error parameter to the positioning server or the base station.

In a fourth aspect, an embodiment of the present disclosure further provides a network device, applied to a positioning server, including a memory, a transceiver and a processor, wherein the memory is configured to store a computer program, the transceiver is configured to transmit and receive data under the control of the processor, and the processor is configured to read the computer program in the memory to implement following steps:

receiving positioning configuration information transmitted by a base station, and transmitting the positioning configuration information to a terminal, wherein the positioning configuration information includes at least one of PRS configuration information or a first frequency layer error parameter;

receiving a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and solving a position of the terminal according to the positioning measurement quantity, to obtain target position information of the terminal.

Optionally, the processor is further configured to read the computer program in the memory to implement following steps:

receiving frequency layer aggregation capability information transmitted by the terminal; and transmitting frequency layer aggregation indication information to the terminal according to the frequency layer aggregation capability information.

Optionally, the frequency layer aggregation capability information includes at least one of: a quantity of aggregated frequency layers, whether frequency layer aggregation is supported, or a receiving filter bandwidth.

Optionally, the frequency layer aggregation indication information includes: indication as to whether the terminal is to perform frequency layer aggregation, a frequency layer aggregation reporting manner, and indication of indexes of frequency layers for aggregation.

Optionally, after the transmitting the positioning configuration information to the terminal, the processor is further configured to read the computer program in the memory to implement following step:

receiving a second frequency layer error parameter of different frequency layers that is transmitted by the terminal or the base station.

Optionally, the solving the position of the terminal according to the positioning measurement quantity to obtain the target position information of the terminal includes:

compensating for errors in the positioning measurement quantity according to the positioning measurement quantity and the second frequency layer error parameter, to obtain compensated positioning measurement quantity; and solving the position of the terminal according to the compensated positioning measurement quantity, to obtain the target position information of the terminal.

In a fifth aspect, an embodiment of the present disclosure further provides a positioning apparatus, applied to a terminal, including:

a first receiving module, configured to receive positioning configuration information, wherein the positioning configuration information includes at least one of PRS configuration information or a first frequency layer error parameter;

a first calculating module, configured to calculate a positioning measurement quantity according to the positioning configuration information; and a first reporting module, configured to report the positioning measurement quantity to a positioning server;

wherein the positioning measurement quantity is reported in the following manner: one positioning measurement quantity is reported for multiple frequency layers of one TRP, or one positioning measurement quantity is reported for each frequency layer of one TRP.

In a sixth aspect, an embodiment of the present disclosure further provides a positioning apparatus, applied to a positioning server, including:

a second receiving module, configured to receive positioning configuration information transmitted by a base station, and transmit the positioning configuration information to a terminal, wherein the positioning configuration information includes at least one of PRS configuration information or a first frequency layer error parameter;

a third receiving module, configured to receive a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and a first solving module, configured to solve a position of the terminal according to the positioning measurement quantity, to obtain target position information of the terminal.

In a seventh aspect, an embodiment of the present disclosure further provides a positioning system, including the terminal described in the third aspect and the network device described in the fourth aspect.

In an eighth aspect, an embodiment of the present disclosure further provides a processor readable storage medium storing a computer program, wherein the computer program is configured to be executed by a processor, to implement the aforementioned positioning method.

In a ninth aspect, an embodiment of the present disclosure further provides a computer program including computer readable codes, wherein the computer readable codes are configured to be executed by a computing and processing device, to implement the aforementioned positioning method.

In the embodiments of the present disclosure, in case that the terminal has received the positioning configuration information including at least one of PRS configuration information or a first frequency layer error parameter, the terminal may calculate a positioning measurement quantity according to the positioning configuration information; the terminal reports, to a positioning server, one positioning measurement quantity for multiple frequency layers of one TRP, or one positioning measurement quantity for each frequency layer of one TRP; and the positioning server may obtain a more accurate positioning measurement quantity based on the positioning configuration information and the manner in which the terminal reports the positioning measurement quantity. Thus, the position of the terminal may be determined more accurately, thereby improving positioning accuracy.

The above description is only an overview of the technical solutions of the present disclosure. In order to understand more clearly the technical means of the present disclosure, such that they can be implemented in accordance with the contents of the specification, and in order to make the above and other purposes, features and advantages of the present disclosure more obvious and understandable, specific implementations of the present disclosure are provided hereinafter.

BRIEF DESCRIPTION OF THE DRAWINGS

In order to more clearly illustrate the technical solutions in the embodiments of the present disclosure or in the related art, the following is a brief description of the drawings required for use in the description of the embodiments or related art, it is obvious that the drawings in the following description are some embodiments of the present disclosure, and other drawings can be obtained from these drawings without creative efforts for a person of ordinary skill in the art.

DETAILED DESCRIPTION

Figure 1:
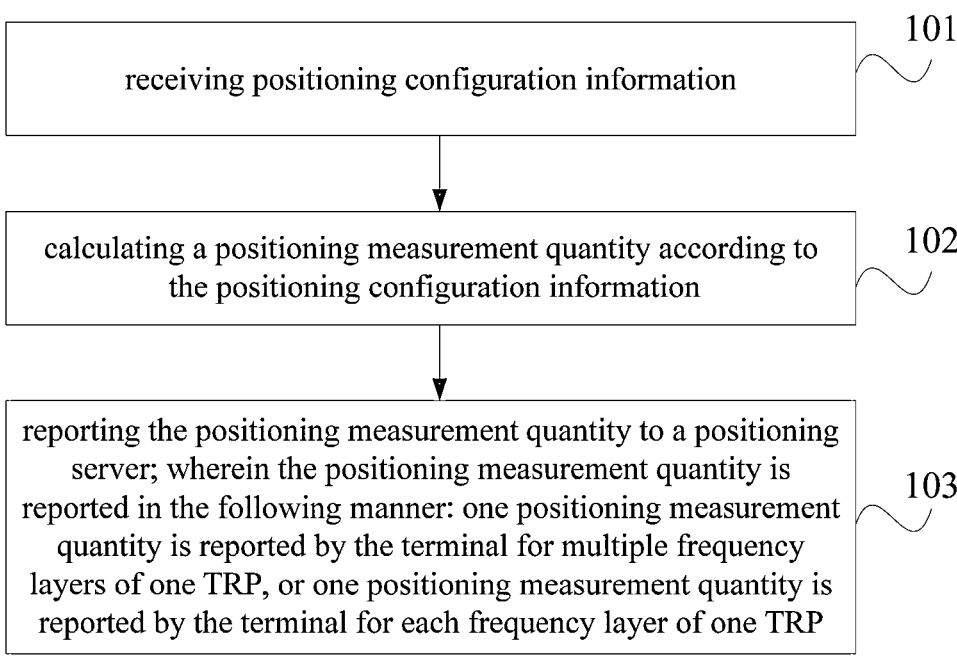
FIG. 1 is a flow diagram of a positioning method performed by a terminal according to an embodiment of the present disclosure.

In order to make the technical problem, the technical solutions and the advantages of the present disclosure clearer, the following clearly and completely describes the technical solutions according to the embodiments of the present disclosure with reference to the accompanying drawings in the embodiments of the present disclosure. The embodiments in the following description are merely a part rather than all of the embodiments of the present disclosure. All other embodiments obtained by persons of ordinary skill in the art based on the embodiments of the present disclosure without creative efforts shall fall within the scope of the present disclosure.

The term "and/or" used herein merely refers to an association relationship between objects to be associated and means there are three relationships. For example, A and/or B may represent: only A exists, both A and B exist, and only B exists. The symbol "/" as used herein generally represents there is a "or" relationship between the objects to be associated.

The term "multiple" used herein refers to two or more, and other quantifiers are similar thereto.

Embodiments of the present disclosure provide a positioning method and apparatus, and terminal and device, to improve positioning accuracy for terminals.

The method and apparatus are based on the same creative concept, and share similar principle to solve the problem. Therefore, for the implementation of one of the method and the apparatus, references may be made to the other of the method and the apparatus. A repeated description is omitted herein.

In addition, the solution provided by the embodiments of the present disclosure may be applicable to multiple kinds of systems, especially a $5^{th}$ generation (5G) system. For example, an applicable system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS) system, a worldwide interoperability for microwave access (WiMAX) system, a 5G New Radio (NR) system, or the like. All of the multiple kinds of systems include a terminal and a network device. The systems may include a core network portion as well, for example, evolved packet system (EPS), 5G system (5GS) or the like.

The terminal involved in the embodiments of the present disclosure may be a device that provides voice and/or data connectivity to a user, a handheld device with a radio connection function, or other processing devices connected to a radio modem or the like. In different systems, the names of terminal devices may be different. For example, in a 5G system, a terminal may be called user equipment (UE). Wireless terminal can communicate with one or more core networks (CNs) via a radio access network (RAN), and wireless terminal may be mobile terminal, such as mobile phones (or called "cellular" phones) and computers with mobile terminal, such as portable, pocket-sized, hand-held, computer built-in or vehicle-mounted mobile apparatuses, which exchange voice and/or data with the radio access network. For example, personal communication service (PCS) phones, cordless phones, session initiated protocol (SIP) phones, wireless local loop (WLL) stations, personal digital assistant (PDA), and other devices. The wireless terminal may also be called a system, subscriber unit, subscriber station, mobile station, mobile, remote station, access point, remote terminal, access terminal, user terminal, user agent, and user device, which are not limited in the embodiments of the present disclosure.

The network device involved in the embodiments of the present disclosure may be a base station. The base station may include multiple cells that provide services to terminals. Depending on the specific application scenario, the base station may be called access point, or may be a device in the access network that communicates over an air interface with wireless terminals through one or more sectors, or may be called other name. The network device may be used for converting the received radio frames into Internet protocol (IP) packets or vice versa, and serves as a router between the wireless terminals and the rest of the access network. The rest of the access network may include an IP communication network. The network device may also coordinate the attribute management of the air interface. For example, the network device involved in the embodiments of the present disclosure may be a base transceiver station (BTS) in the global system for mobile communications (GSM) or code division multiple access (CDMA), a NodeB in the wideband code division multiple access (WCDMA), an evolved Node B (eNB or e-NodeB) in Long Term Evolution (LTE) system, a 5G base station (gNB) in 5G network architecture (next generation system), a base station in 6G, a home evolved Node B (HeNB), a relay node, a femto, a pico, or the like, which is not limited herein. In some network architectures, the network device may include a centralized unit (CU) node and a distributed unit (DU) node, which may be located geographically separated.

The network device and the terminal may each perform multi-input multi-output (MIMO) transmission with each other by using one or more antennas. The MIMO transmission may be single user MIMO (SU-MIMO) or multiple user MIMO (MU-MIMO). According to the configuration and quantity of antenna combinations, the MIMO transmission may be two dimensional-MIMO (2D-MIMO), three dimensional-MIMO (3D-MIMO), full dimensional-MIMO (FD-MIMO) or massive-MIMO, and may be diversity transmission, precoded transmission, beam forming transmission, or the like.

FIG. 1 is a flow diagram of a positioning method according to an embodiment of the present disclosure. The method is performed by a terminal and specifically includes following steps 101 to 103.

Step 101, receiving positioning configuration information, wherein the positioning configuration information may include, but is not limited to, at least one of positioning reference signal (PRS) configuration information or a first frequency layer error parameter.

Specifically, in the step 101, the positioning configuration information received by the terminal may be transmitted by a base station, or by a positioning server, which is not specifically limited herein. The base station determines the positioning configuration information, and sends the positioning configuration information to the terminal or sends, via the positioning server, the positioning configuration information to the terminal, such that the terminal may calculate the positioning measurement quantity according to the positioning configuration information, and such that the positioning server may obtain the target position information of the terminal based on the positioning measurement quantity, to provide positioning accuracy.

Optionally, the PRS configuration information may include: configurations of M PRS frequency layers, wherein each PRS frequency layer includes N TRPs, each TRP includes S PRS resource sets, and each PRS resource set includes T PRS resources, where M, N, S and T are all positive integers.

Optionally, the first frequency layer error parameter may include, but is not limited to, at least one of: a timing offset, a phase offset, a frequency error, or a power offset between different frequency layers. In other words, the first frequency layer error parameter may be used for compensating for the frequency error, phase error, power imbalance or the like between different frequency layers due to the device or other reasons, which is not specifically limited herein.

Step 102, calculating a positioning measurement quantity according to the positioning configuration information.

Specifically, in the step 102, the terminal may calculate a positioning measurement quantity according to the positioning configuration information sent by the base station or the server. If the positioning configuration information includes the PRS configuration information, the terminal may calculate the positioning measurement quantity according to the PRS configuration information; if the positioning configuration information includes the PRS configuration information and the first frequency layer error parameter, the terminal may calculate a more accurate positioning measurement quantity according to the PRS configuration information and the first frequency layer error parameter.

Step 103, reporting the positioning measurement quantity to a positioning server; wherein the positioning measurement quantity may be reported in the following manner: one positioning measurement quantity is reported by the terminal for multiple frequency layers of one TRP, or one positioning measurement quantity is reported by the terminal for each frequency layer of one TRP. Specifically, in the step 103, the terminal may report one positioning measurement quantity for each frequency layer of one TRP, or the terminal may report one positioning measurement quantity for multiple frequency layers of one TRP, or the terminal may report one positioning measurement quantity for all frequency layers of one TRP; and the terminal may report for other TRPs in the above reporting manner, which is not described in detail herein.

For example, assuming that one TRP is configured with 6 (i.e., M=6) PRS frequency layers (i.e., frequency layers), the terminal may report one positioning measurement quantity for each frequency layer of one TRP, that is, the terminal reports 6 positioning measurement quantities for one TRP; or, the terminal may report one positioning measurement quantity for three frequency layers of one TRP, that is, the terminal reports 2 positioning measurement quantities for one TRP; or, the terminal may report one positioning measurement quantity for all frequency layers of one TRP, that is, the terminal reports one positioning measurement quantity for one TRP.

In the embodiments of the present disclosure, in case that the terminal has received the positioning configuration information including at least one of PRS configuration information or a first frequency layer error parameter, the terminal may calculate a positioning measurement quantity according to the positioning configuration information; the terminal reports, to a positioning server, one positioning measurement quantity for multiple frequency layers of one TRP, or one positioning measurement quantity for each frequency layer of one TRP; and the positioning server may obtain a more accurate positioning measurement quantity based on the positioning configuration information and the manner in which the terminal reports the positioning measurement quantity. Thus, the position of the terminal may be determined more accurately, thereby improving positioning accuracy.

Optionally, prior to the step 101, the method may further include:

transmitting frequency layer aggregation capability information to the positioning server; and receiving frequency layer aggregation indication information transmitted by the positioning server.

Further, the frequency layer aggregation capability information may include, but is not limited to, at least one of: a quantity of aggregated frequency layers, whether frequency layer aggregation is supported, or a receiving filter bandwidth.

Further, the frequency layer aggregation indication information may include: indication as to whether the terminal is to perform frequency layer aggregation, a frequency layer aggregation reporting manner, and indication of indexes of frequency layers for aggregation.

Further, the frequency layer aggregation reporting manner may include any one of:

reporting one positioning measurement quantity for multiple frequency layers of one TRP, or reporting one positioning measurement quantity for each frequency layer of one TRP.

Specifically, the frequency layer aggregation reporting manner for the terminal may be reporting one positioning measurement quantity for each frequency layer of one TRP, or reporting one positioning measurement quantity for multiple frequency layers of one TRP, or reporting one positioning measurement quantity for all frequency layers of one TRP.

Specifically, the terminal sends the frequency layer aggregation capability information to the positioning server, and the positioning server may obtain, based on the frequency layer aggregation capability information, information about the quantity of frequency layers need to be aggregated, whether frequency layer aggregation is supported by the terminal, the filter bandwidth which the terminal can receive, or the like, so that the positioning server may indicate, based on the frequency layer aggregation capability information of the terminal, to terminal whether to perform frequency layer aggregation, the frequency layer aggregation reporting manner to be used, indexes of frequency layers for aggregation, and the like, which are not specifically limited herein.

For example, the positioning server may define a piece of frequency layer aggregation indication information in signaling, and define that the terminal may perform frequency layer aggregation if the frequency layer aggregation indication information is in an On status. If the terminal may perform frequency layer aggregation, the terminal may perform the frequency layer aggregation based on positioning configuration information to obtain a positioning measurement quantity and report the positioning measurement quantity to the positioning server.

Optionally, after the step of receiving the frequency layer aggregation indication information transmitted by the positioning server, the step 103 may specifically includes:

> reporting the positioning measurement quantity to the positioning server according to the frequency layer aggregation indication information.

Specifically, in case that the terminal has received the frequency layer aggregation indication information, and if the terminal is allowed to perform frequency layer aggregation, the terminal may perform the frequency layer aggregation based on positioning configuration information to obtain a positioning measurement quantity, and report the positioning measurement quantity to the positioning server according to the frequency layer aggregation reporting manner in the frequency layer aggregation indication information.

For example, if the frequency layer aggregation reporting manner indicated in the frequency layer aggregation indication information received by the terminal is: reporting one positioning measurement quantity for multiple frequency layers of one TRP, the terminal calculates a compensated positioning measurement quantity based on the positioning configuration information, and feeds back one compensated positioning measurement quantity for the multiple frequency layers of one TRP; if the frequency layer aggregation reporting manner indicated in the frequency layer aggregation indication information received by the terminal is: reporting one positioning measurement quantity for each frequency layer of one TRP, the terminal calculates positioning measurement quantities based on the positioning configuration information, and feeds back one positioning measurement quantity for each frequency layer of one TRP.

Optionally, in case that the positioning configuration information includes the first frequency layer error parameter and the PRS configuration information, the step 102 may specifically include:

> compensating for errors in PRSs of different frequency layers according to the PRS configuration information and the first frequency layer error parameter, to obtain compensated PRSs; and
>
> calculating the positioning measurement quantity according to the compensated PRSs.

Specifically, if the terminal needs to report one positioning measurement quantity for multiple frequency layers of one TRP, and the positioning configuration information transmitted by the positioning server or the base station includes the first frequency layer error parameter and the PRS configuration information, the terminal may compensate for errors in PRSs of different frequency layers according to the first frequency layer error parameter and the PRS configuration information, to obtain compensated PRSs. Based on the compensated PRSs, the terminal may calculate a more accurate positioning measurement quantity, so that the positioning server may obtain more accurate target position information of the terminal according to the more accurate positioning measurement quantity, thereby achieving accurate determination of the position of the terminal and improving positioning accuracy. The first frequency layer error parameter includes errors between different frequency layers, and may be obtained by the base station during reception of uplink signals in uplink and downlink transmission, and may be sent by the base station to the terminal, or sent by the base station to the positioning server and then forwarded by the positioning server to the terminal, but the manner in which the first frequency layer error parameter is obtained is not limited thereto.

For example, the positioning configuration information is transmitted by the positioning server to the terminal. Let's suppose that the terminal needs to report one positioning measurement quantity for all frequency layers of one TRP, in other words, the positioning measurement quantity is obtained by the terminal through measuring the PRSs transmitted via M PRS frequency layers. For one TRP, the first frequency layer error parameter from the positioning server configures M−1 frequency errors, where the M−1 frequency errors are frequency offsets of other M−1 PRS frequency layers (i.e., frequency layers) relative to a target frequency layer (e.g., a first frequency layer). The terminal measures the PRSs of the M frequency layers, and compensates for errors (e.g., frequency compensation) in the PRSs of the second to $M^{th}$ frequency layers, respectively. For example, PRSs of each frequency layer undergo corresponding frequency offset compensation, and the mode of compensation may be dividing the PRS frequency of each frequency layer by a corresponding frequency offset, but the mode of compensation is merely exemplary, and the present disclosure is not specifically limited thereto. The compensated PRSs of the M frequency layers may be equivalent to PRSs of one complete broadband, whereby a more accurate positioning measurement quantity is obtained after the estimation and calculation of the positioning measurement quantity. The calculation process of the positioning measurement quantity for other TRPs is similar to the foregoing process, and is not specifically limited herein.

Optionally, after the step 101, the method may further include:

> measuring PRSs of different frequency layers that are transmitted by a base station, to obtain measurement results;
>
> obtaining a second frequency layer error parameter of the different frequency layers according to the measurement results; and
>
> transmitting the second frequency layer error parameter to the positioning server or the base station.

Specifically, if the terminal needs to report one positioning measurement quantity for each frequency layer of one TRP, and the positioning configuration information received by the terminal does not include the first frequency layer error parameter, then the terminal may measure PRSs of different frequency layers, where the PRSs are transmitted by the base station, to obtain measurement results, and the terminal obtains the second frequency layer error parameter of the different frequency layers according to the measurement results corresponding to the PRSs.

For example, the positioning configuration information is transmitted by the positioning server to the terminal. Let's suppose that the terminal reports one positioning measurement quantity for each frequency layer of one TRP, in other words, each positioning measurement quantity is obtained by the terminal through measuring the PRSs transmitted in one PRS frequency layer. If the terminal transmits the second frequency layer error parameter to the positioning server, the positioning server may compensate for errors in the received positioning measurement quantity according to the second frequency layer error parameter, to obtain a more accurate compensated positioning measurement quantity, thereby further obtaining more accurate target position information of the terminal. If the terminal transmits the second frequency layer error parameter to the base station, the base station may forward the second frequency layer error parameter to the positioning server, such that the positioning server obtains more accurate target position information of the terminal.

Further, the second frequency layer error parameter may include, but is not limited to, at least one of: a timing offset, a phase offset, a frequency error, or a power offset between different frequency layers.

In summary, in the embodiments of the present disclosure, in case that the terminal has received the positioning configuration information, the terminal may calculate a positioning measurement quantity according to the positioning configuration information; or the terminal transmits the frequency layer aggregation capability information to the positioning server, the positioning server may transmit the frequency layer aggregation indication information to the terminal according to the frequency layer aggregation capability information, and the terminal may calculate a positioning measurement quantity based on the positioning configuration information and the frequency layer aggregation indication information; the terminal may report, to the positioning server, one positioning measurement quantity for multiple frequency layers of one TRP, or one positioning measurement quantity for each frequency layer of one TRP; and due to the positioning configuration information and the manner in which the terminal reports the positioning measurement quantity, the positioning server may obtain a more accurate positioning measurement quantity. Thus, the target position information of the terminal may be determined more accurately, thereby improving positioning accuracy.

Figure 2:
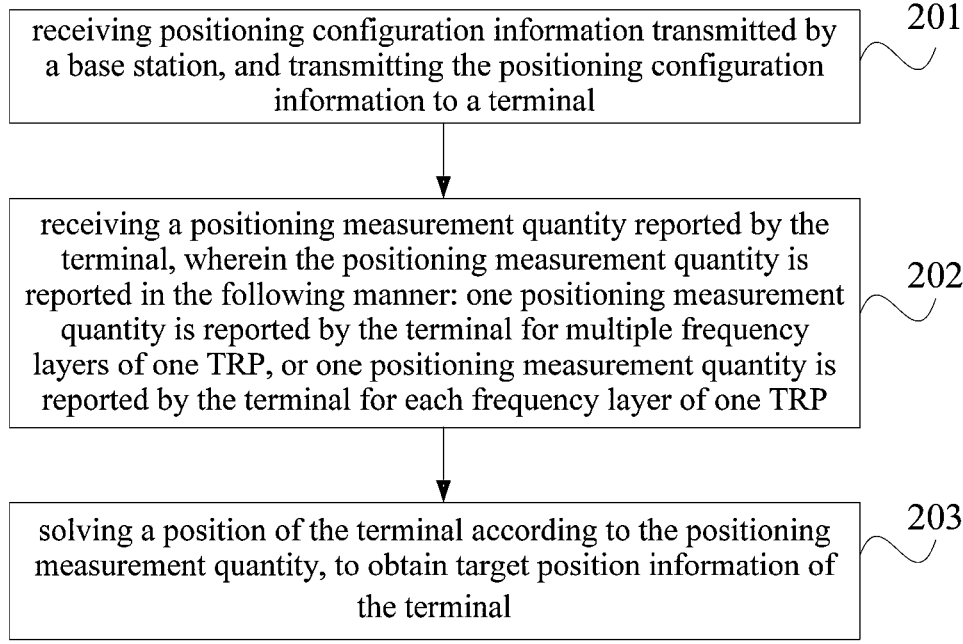
FIG. 2 is a flow diagram of a positioning method performed by a positioning server according to an embodiment of the present disclosure.

FIG. 2 is a flow diagram of a positioning method according to an embodiment of the present disclosure. The method is performed by a positioning server and specifically includes following steps 201 to 203.

Step 201, receiving positioning configuration information transmitted by a base station, and transmitting the positioning configuration information to a terminal, wherein the positioning configuration information includes at least one of PRS configuration information or a first frequency layer error parameter.

Specifically, in the step 201, the positioning server receives the positioning configuration information transmitted by the base station, and transmits the positioning configuration information to the terminal.

Optionally, the PRS configuration information may include: configurations of M PRS frequency layers, wherein each PRS frequency layer includes N TRPs, each TRP includes S PRS resource sets, and each PRS resource set includes T PRS resources, where M, N, S and T are all positive integers.

Optionally, the first frequency layer error parameter may include, but is not limited to, at least one of: a timing offset, a phase offset, a frequency error, or a power offset between different frequency layers. In other words, the first frequency layer error parameter may be used for compensating for the frequency error, phase error, power imbalance or the like between different frequency layers due to the device or other reasons, which is not specifically limited herein.

Step 202, receiving a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP.

Specifically, in the step 202, the positioning server receives the positioning measurement quantity calculated by the terminal based on the positioning configuration information. The positioning server may obtain one positioning measurement quantity for each frequency layer of one TRP, or the positioning server may obtain one positioning measurement quantity for multiple frequency layers of one TRP, or the positioning server may obtain one positioning measurement quantity for all frequency layers of one TRP.

For example, assuming that one TRP is configured with 6 (i.e., M=6) PRS frequency layers (i.e., frequency layers), the terminal may report one positioning measurement quantity for each frequency layer of one TRP, that is, the terminal reports 6 positioning measurement quantities for one TRP, and the positioning server obtains six positioning measurement quantities for one TRP; or, the terminal may report one positioning measurement quantity for three frequency layers of one TRP, that is, the terminal reports 2 positioning measurement quantities for one TRP, and the positioning server obtains two positioning measurement quantities for one TRP; or, the terminal may report one positioning measurement quantity for all frequency layers of one TRP, that is, the terminal reports one positioning measurement quantity for one TRP, and the positioning server obtains one positioning measurement quantity for one TRP.

Step 203, solving a position of the terminal according to the positioning measurement quantity, to obtain target position information of the terminal.

Specifically, after receiving the positioning measurement quantity transmitted by the terminal, the positioning server solves the position of the terminal according to the positioning measurement quantity, to obtain target position information of the terminal.

In the embodiments of the present disclosure, after receiving the positioning configuration information transmitted by the base station, the positioning server transmits the positioning configuration information to the terminal, so that the terminal may calculate a positioning measurement quantity based on the positioning configuration information and transmit the positioning measurement quantity to the positioning server, and the positioning server solves the position of the terminal according to the positioning measurement quantity, to obtain target position information of the terminal; and due to the positioning configuration information and the manner in which the terminal reports the positioning measurement quantity, the positioning server may obtain a more accurate positioning measurement quantity. Thus, the position of the terminal may be determined more accurately, thereby improving positioning accuracy.

Optionally, the method may further include:

receiving frequency layer aggregation capability information transmitted by the terminal; and transmitting frequency layer aggregation indication information to the terminal according to the frequency layer aggregation capability information.

Further, the frequency layer aggregation capability information may include, but is not limited to, at least one of: a quantity of aggregated frequency layers, whether frequency layer aggregation is supported, or a receiving filter bandwidth.

Optionally, the frequency layer aggregation indication information may include: indication as to whether the terminal is to perform frequency layer aggregation, a frequency layer aggregation reporting manner, and indication of indexes of frequency layers for aggregation.

Further, the frequency layer aggregation reporting manner may include any one of:

reporting one positioning measurement quantity for multiple frequency layers of one TRP, or reporting one positioning measurement quantity for each frequency layer of one TRP.

Specifically, the frequency layer aggregation reporting manner for the terminal may be reporting one positioning measurement quantity for each frequency layer of one TRP, or reporting one positioning measurement quantity for multiple frequency layers of one TRP, or reporting one positioning measurement quantity for all frequency layers of one TRP.

Specifically, the terminal sends the frequency layer aggregation capability information to the positioning server, and the positioning server may obtain, based on the frequency layer aggregation capability information, information about the quantity of frequency layers need to be aggregated, whether frequency layer aggregation is supported by the terminal, the filter bandwidth which the terminal can receive, or the like, so that the positioning server may indicate, based on the frequency layer aggregation capability information of the terminal, to terminal whether to perform frequency layer aggregation, the frequency layer aggregation reporting manner to be used, indexes of frequency layers for aggregation, and the like, which are not specifically limited herein.

For example, the positioning server may define a piece of frequency layer aggregation indication information in signaling, and define that the terminal may perform frequency layer aggregation if the frequency layer aggregation indication information is in an On status. If the terminal may perform frequency layer aggregation, the terminal may perform the frequency layer aggregation based on positioning configuration information to obtain a positioning measurement quantity and report the positioning measurement quantity to the positioning server. After receiving the positioning measurement quantity, the positioning server solves the position of the terminal according to the positioning measurement quantity, to obtain more accurate target position information of the terminal.

Optionally, in case that the positioning configuration information includes the PRS configuration information, after the transmitting the positioning configuration information to the terminal in the step 201, the method further includes:

receiving a second frequency layer error parameter of different frequency layers that is transmitted by the terminal or the base station.

Specifically, if the terminal reports one positioning measurement quantity for multiple frequency layers of one TRP, the positioning configuration information transmitted by the positioning server includes the first frequency layer error parameter and the PRS configuration information, so that the terminal may calculate a positioning measurement quantity according to the first frequency layer error parameter and the PRS configuration information, thereby obtaining a more accurate positioning measurement quantity. The terminal transmits the more accurate positioning measurement quantity to the positioning server, and the positioning server may obtain more accurate target position information of the terminal according to the more accurate positioning measurement quantity, thereby improving positioning accuracy. The first frequency layer error parameter includes errors between different frequency layers, and may be obtained by the base station during reception of uplink signals in uplink and downlink transmission, and may be sent by the base station to the positioning server and then forwarded by the positioning server to the terminal, but the manner in which the first frequency layer error parameter is obtained is not limited thereto.

If the frequency layer aggregation reporting manner for the terminal is: reporting one positioning measurement quantity for each frequency layer of one TRP, then after receiving the positioning configuration information, the terminal calculates a positioning measurement quantity of each frequency layer based on the positioning configuration information, and transmits the positioning measurement quantity of each frequency layer to the positioning server, and the terminal measures PRSs of different frequency layers, where the PRSs are transmitted by the base station, to obtain measurement results, and the terminal obtains the second frequency layer error parameter of the different frequency layers according to the measurement results, and transmits the second frequency layer error parameter to the positioning server directly, or transmits the second frequency layer error parameter to the base station and the base station forwards the second frequency layer error parameter to the positioning server.

Optionally, the second frequency layer error parameter may include, but is not limited to, at least one of: a timing offset, a phase offset, a frequency error, or a power offset between different frequency layers.

Optionally, the step 203 may specifically include:

compensating for errors in the positioning measurement quantity according to the positioning measurement quantity and the second frequency layer error parameter, to obtain compensated positioning measurement quantity; and solving the position of the terminal according to the compensated positioning measurement quantity, to obtain the target position information of the terminal.

Specifically, in case that the positioning server has received the second frequency layer error parameter and the positioning measurement quantity transmitted by the terminal, the positioning server compensates for errors in the positioning measurement quantity according to the positioning measurement quantity and the second frequency layer error parameter, to obtain a compensated positioning measurement quantity, that is, a more accurate positioning measurement quantity may be obtained. The positioning server solves the position of the terminal according to the more accurate compensated positioning measurement quantity, to obtain the target position information of the terminal, thereby improving positioning accuracy.

In summary, in the embodiments of the present disclosure, in case that the terminal has received the positioning configuration information, the terminal may calculate a positioning measurement quantity according to the positioning configuration information; or the terminal transmits the frequency layer aggregation capability information to the positioning server, the positioning server may transmit the frequency layer aggregation indication information to the terminal according to the frequency layer aggregation capability information, and the terminal may calculate a positioning measurement quantity based on the positioning configuration information and the frequency layer aggregation indication information; the terminal may report, to the positioning server, one positioning measurement quantity for multiple frequency layers of one TRP, or one positioning measurement quantity for each frequency layer of one TRP; and due to the positioning configuration information and the manner in which the terminal reports the positioning measurement quantity, the positioning server may obtain a more accurate positioning measurement quantity. Thus, the target position information of the terminal may be determined more accurately, thereby improving positioning accuracy.

The foregoing positioning methods are described in detail with reference to specific embodiments below.

Embodiment 1

Figure 3:
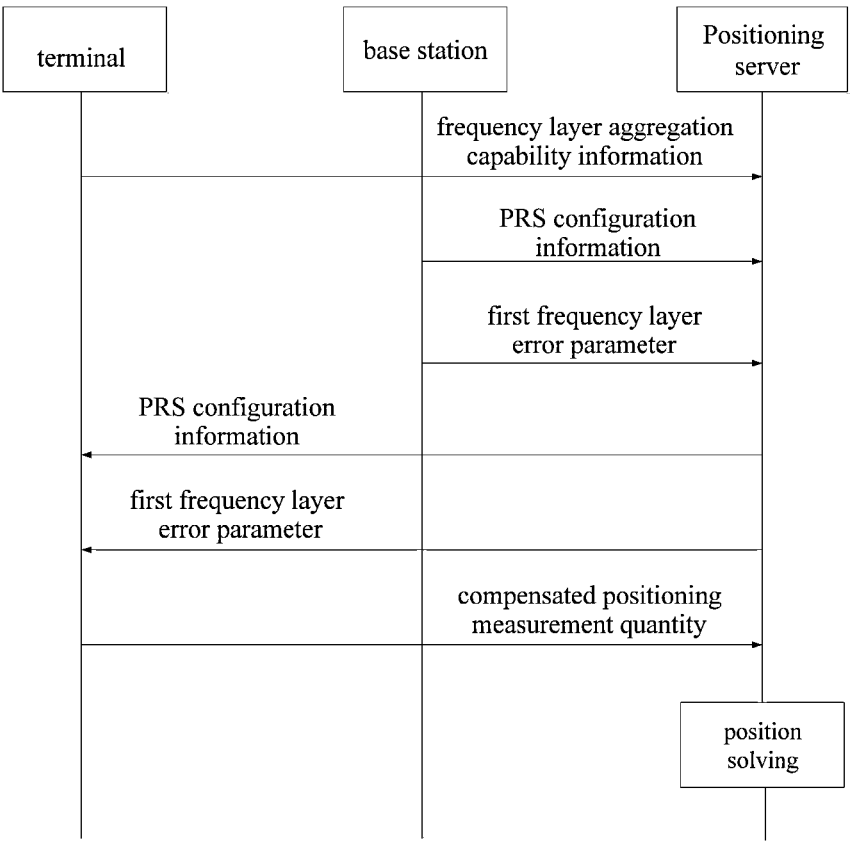
FIG. 3 is a detailed flow diagram of a positioning method according to an embodiment of the present disclosure.

As shown in FIG. 3, in a step a1, a terminal transmits, to a positioning server, frequency layer aggregation capability information, e.g., a quantity of frequency layers which the terminal can measure and aggregate (e.g. 4), or the like.

In a step a2, a base station determines a first frequency layer error parameter and PRS configuration information of positioning configuration information, and transmits the first frequency layer error parameter and the PRS configuration information to the positioning server. The PRS configuration information includes: configurations of M PRS frequency layers, wherein each PRS frequency layer includes N TRPs, each TRP includes S PRS resource sets, and each PRS resource set includes T PRS resources, where M, N, S and T are all positive integers.

The first frequency layer error parameter of the M PRS frequency layers that is included in the positioning configuration information is used for compensating for the frequency error, phase error, power imbalance or the like between different frequency layers due to the device. For example, The first frequency layer error parameter includes frequency errors between different frequency layers, and the frequency errors may be estimated by the base station during reception of uplink signals in uplink and downlink transmission.

In a step a3, the positioning server transmits the first frequency layer error parameter and the PRS configuration information of the positioning configuration information to the terminal. The positioning server may transmit the frequency layer aggregation indication information to the terminal according to the frequency layer aggregation capability information transmitted by the terminal, to indicate to the terminal that frequency layer aggregation reporting is to be adopted. For example, the positioning server defines a piece of frequency layer aggregation reporting indication information in signaling, and defines that the terminal is to perform frequency layer aggregation reporting if the frequency layer aggregation reporting indication information is in an On status. If the frequency layer aggregation reporting manner for the terminal is reporting one positioning measurement quantity for all frequency layers of one TRP, the terminal reports one positioning measurement quantity for said one TRP, where the positioning measurement quantity is obtained by measuring PRSs transmitted via the M PRS frequency layers.

In a step a4, the terminals calculates one positioning measurement quantity (i.e., compensated positioning measurement quantity) for each TRP according to the frequency layer aggregation indication information, the PRS configuration information and the first frequency layer error parameter transmitted by the positioning server, and reports one positioning measurement quantity for each TRP to the positioning server. The specific process may include: for one of the TRPs, the first frequency layer error parameter from the positioning server configures M−1 frequency errors, where the M−1 frequency errors are frequency offsets of other M−1 frequency layers relative to a first frequency layer. The terminal measures the PRSs of the M frequency layers, and compensates for frequency errors in the PRSs of the second to $M^{th}$ frequency layers, respectively. For example, PRSs of each frequency layer undergo corresponding frequency offset compensation, and the mode of compensation may be dividing the PRS of each frequency layer by the frequency offset. The compensated PRSs of the M frequency layers may be equivalent to PRSs of one complete broadband, whereby a more accurate positioning measurement quantity is obtained by the terminal after the estimation and calculation of the positioning measurement quantity. The terminal transmits the positioning measurement quantity to the positioning server. After receiving the positioning measurement quantity, the positioning server solves the position of the terminal, to obtain target position information of the terminal. Thus, bandwidth of PRS is enlarged, and positioning accuracy is improved.

Embodiment 2

Figure 4:
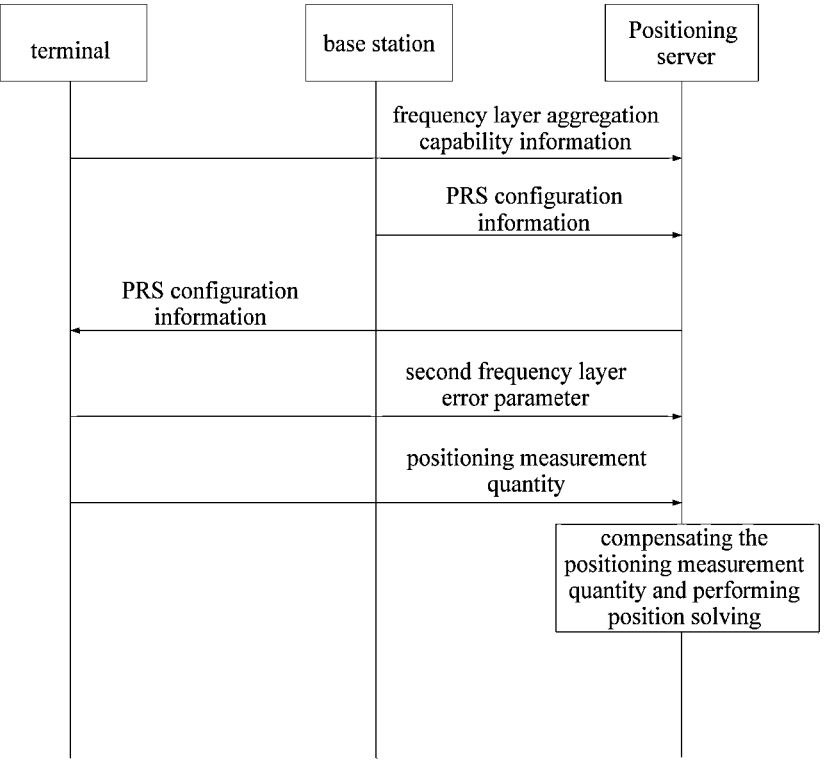
FIG. 4 is another detailed flow diagram of a positioning method according to an embodiment of the present disclosure.

As shown in FIG. 4, in a step b1, a terminal transmits, to a positioning server, frequency layer aggregation capability information, e.g., a quantity of frequency layers which the terminal can measure and aggregate (e.g. 4), or the like.

In a step b2, a base station determines PRS configuration information of positioning configuration information, and transmits the PRS configuration information to the positioning server. The PRS configuration information includes: configurations of M PRS frequency layers, wherein each PRS frequency layer includes N TRPs, each TRP includes S PRS resource sets, and each PRS resource set includes T PRS resources, where M, N, S and T are all positive integers.

In a step b3, the positioning server transmits the PRS configuration information of the positioning configuration information to the terminal. The positioning server may transmit the frequency layer aggregation indication information to the terminal according to the frequency layer aggregation capability information transmitted by the terminal, to indicate to the terminal that frequency layer aggregation reporting is to be adopted. For example, the positioning server defines a piece of frequency layer aggregation reporting indication information in signaling, and defines that the terminal is to perform frequency layer aggregation reporting if the frequency layer aggregation reporting indication information is in an On status. If the frequency layer aggregation reporting manner for the terminal is reporting one positioning measurement quantity for each frequency layer of one TRP, the terminal reports M positioning measurement quantities for said one TRP, where each of the positioning measurement quantities is obtained by measuring PRSs transmitted via one frequency layer.

In a step b4, the terminal measures PRSs transmitted by the base station via different frequency layers, and calculates the frequency layer errors of the different frequency layers according to the frequency layer aggregation indication information transmitted by the positioning server, to obtain the second frequency layer error parameter. The terminal reports to the positioning server multiple positioning measurement quantities of different frequency layers of each TRP, and reports to the positioning server the second frequency layer error parameter of each TRP.

After receiving the positioning measurement quantities and the second frequency layer error parameter, the positioning server compensates the positioning measurement quantities of different frequency layers (e.g., aggregation processing) to obtain compensated positioning measurement quantities. The positioning server solves the position of the terminal based on the compensated positioning measurement quantities, to obtain target position information of the terminal. Thus, bandwidth of PRS is enlarged, and positioning accuracy is improved.

In summary, in the embodiments of the present disclosure, through the first frequency layer error parameter or second frequency layer error parameter, PRSs transmitted via multiple different frequency layers are aggregated into one broadband PRS, which can improve positioning accuracy; specifically, when multiple different frequency layers are aggregated, the frequency layer error parameter between various frequency layers is configured by the positioning server to the terminal, or is calculated by the terminal and reported to the positioning server, such that the positioning server obtains more accurate target position information of the terminal, which not only enlarges the bandwidth of PRS, but also improves positioning accuracy.

The positioning methods provided by the embodiments of the present disclosure are introduced above. Positioning apparatuses according to embodiments of the present disclosure are described hereinafter with reference to the drawings.

Figure 5:
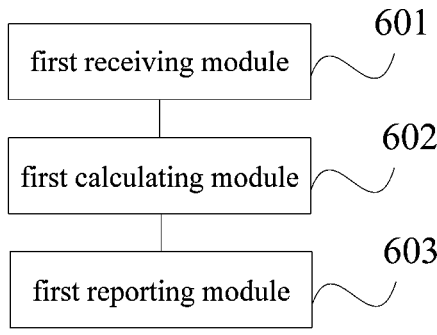
FIG. 5 is a block diagram of a positioning apparatus applied to a terminal according to an embodiment of the present disclosure.

Referring to FIG. 5, an embodiment of the present disclosure further provides a positioning apparatus, applied to a terminal, including:

a first receiving module 601, configured to receive positioning configuration information, wherein the positioning configuration information includes at least one of PRS configuration information or a first frequency layer error parameter;

a first calculating module 602, configured to calculate a positioning measurement quantity according to the positioning configuration information; and a first reporting module 603, configured to report the positioning measurement quantity to a positioning server;

wherein the positioning measurement quantity is reported in the following manner: one positioning measurement quantity is reported for multiple frequency layers of one TRP, or one positioning measurement quantity is reported for each frequency layer of one TRP.

Optionally, prior to the receiving the positioning configuration information, the apparatus further includes:

a first processing module, configured to transmit frequency layer aggregation capability information to the positioning server; and a second processing module, configured to receive frequency layer aggregation indication information transmitted by the positioning server.

Optionally, after the receiving the frequency layer aggregation indication information transmitted by the positioning server, the reporting the positioning measurement quantity to the positioning server includes:

a first reporting unit, configured to report the positioning measurement quantity to the positioning server according to the frequency layer aggregation indication information.

Optionally, the frequency layer aggregation capability information includes at least one of: a quantity of aggregated frequency layers, whether frequency layer aggregation is supported, or a receiving filter bandwidth;

the frequency layer aggregation indication information includes: indication as to whether the terminal is to perform frequency layer aggregation, a frequency layer aggregation reporting manner, and indication of indexes of frequency layers for aggregation.

Optionally, in case that the positioning configuration information includes the first frequency layer error parameter and the PRS configuration information, the first calculating module 602 includes:

a first compensating unit, configured to compensate for errors in PRSs of different frequency layers according to the PRS configuration information and the first frequency layer error parameter, to obtain compensated PRSs; and a calculating unit, configured to calculate the positioning measurement quantity according to the compensated PRSs.

Optionally, after the receiving the positioning configuration information, the apparatus further includes:

a third processing module, configured to measure PRSs of different frequency layers that are transmitted by a base station, to obtain measurement results;

an obtaining module, configured to obtain a second frequency layer error parameter of the different frequency layers according to the measurement results; and a fourth processing module, configured to transmit the second frequency layer error parameter to the positioning server or the base station.

Optionally, the first frequency layer error parameter or the second frequency layer error parameter includes at least one of: a timing offset, a phase offset, a frequency error, or a power offset between the different frequency layers.

Figure 6:
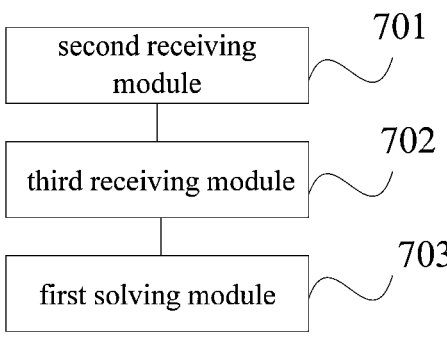
FIG. 6 is a block diagram of a positioning apparatus applied to a positioning server according to an embodiment of the present disclosure.

Referring to FIG. 6, an embodiment of the present disclosure further provides a positioning apparatus, applied to a positioning server, including:

a second receiving module 701, configured to receive positioning configuration information transmitted by a base station, and transmit the positioning configuration information to a terminal, wherein the positioning configuration information includes at least one of PRS configuration information or a first frequency layer error parameter;

a third receiving module 702, configured to receive a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and a first solving module 703, configured to solve a position of the terminal according to the positioning measurement quantity, to obtain target position information of the terminal.

Optionally, the apparatus further includes:

a fourth receiving module, configured to receive frequency layer aggregation capability information transmitted by the terminal; and a first transmitting module, configured to transmit frequency layer aggregation indication information to the terminal according to the frequency layer aggregation capability information.

Optionally, the frequency layer aggregation capability information includes at least one of: a quantity of aggregated frequency layers, whether frequency layer aggregation is supported, or a receiving filter bandwidth;

the frequency layer aggregation indication information includes: indication as to whether the terminal is to perform frequency layer aggregation, a frequency layer aggregation reporting manner, and indication of indexes of frequency layers for aggregation.

Optionally, after the transmitting the positioning configuration information to the terminal, the apparatus further includes:

a fifth receiving module, configured to receive a second frequency layer error parameter of different frequency layers that is transmitted by the terminal or the base station.

Optionally, the first solving module 703 includes:

a second compensating unit, configured to compensate for errors in the positioning measurement quantity according to the positioning measurement quantity and the second frequency layer error parameter, to obtain compensated positioning measurement quantity; and a solving unit, configured to solve the position of the terminal according to the compensated positioning measurement quantity, to obtain the target position information of the terminal.

Optionally, the first frequency layer error parameter or the second frequency layer error parameter includes at least one of: a timing offset, a phase offset, a frequency error, or a power offset between the different frequency layers.

It should be noted that the division of units in the embodiments of the present disclosure is illustrative, and is only a logical function division, and there may be another division method in actual implementation. In addition, the functional units in various embodiments of the present disclosure may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute all or part of the steps of the methods described in the various embodiments of the present disclosure. The aforementioned storage media include: a universal serial bus (USB) flash drive, removable hard disk, read-only memory (ROM), random access memory (RAM), magnetic disk, optical disc or other media that can store program codes.

It should be noted here that the above-mentioned apparatus provided by the embodiments of the present disclosure can implement all the method steps implemented by the above-mentioned method embodiments, and can achieve the same technical effect. Parts and beneficial effects in this embodiment that are the same as those in the method embodiments will not be described in detail here.

An embodiment of the present disclosure further provides a positioning system, including the aforementioned terminal and network device applied to the positioning server.

Figure 7:
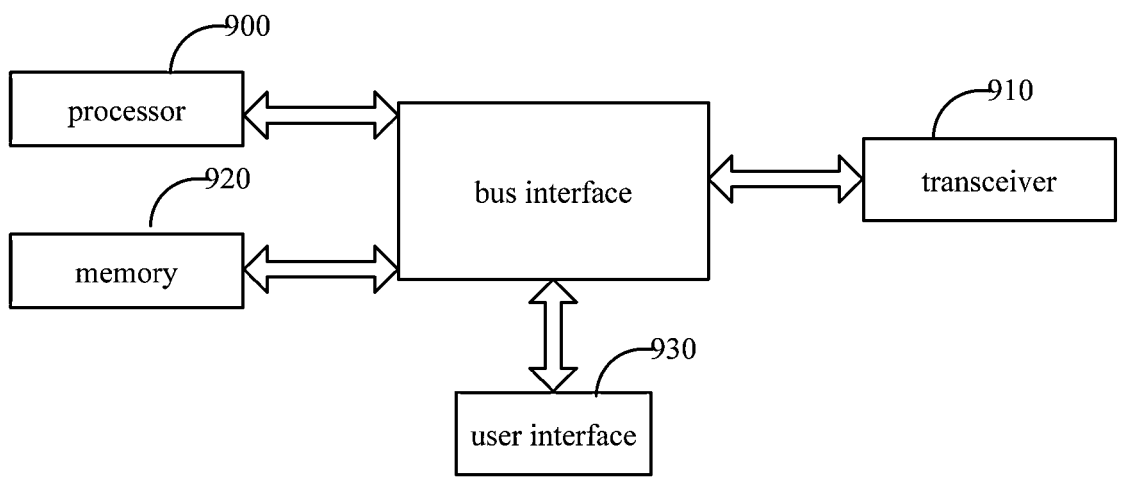
FIG. 7 is a block diagram of a terminal according to an embodiment of the present disclosure.

An embodiment of the present disclosure further provides a terminal. As shown in FIG. 7, the terminal includes a memory 920, a transceiver 910 and a processor 900; wherein the memory 920 is configured to store a computer program, the transceiver 910 is configured to transmit and receive data under the control of the processor 900, and the processor 900 is configured to read the computer program in the memory to implement following steps:

receiving positioning configuration information, wherein the positioning configuration information includes at least one of PRS configuration information or a first frequency layer error parameter;

calculating a positioning measurement quantity according to the positioning configuration information; and reporting the positioning measurement quantity to a positioning server;

wherein the positioning measurement quantity is reported in the following manner: one positioning measurement quantity is reported for multiple frequency layers of one TRP, or one positioning measurement quantity is reported for each frequency layer of one TRP.

Optionally, prior to the receiving the positioning configuration information, the processor 900 is further configured to read the computer program in the memory to implement following steps:

transmitting frequency layer aggregation capability information to the positioning server; and receiving frequency layer aggregation indication information transmitted by the positioning server.

Optionally, after the receiving the frequency layer aggregation indication information transmitted by the positioning server, the reporting the positioning measurement quantity to the positioning server includes:

reporting the positioning measurement quantity to the positioning server according to the frequency layer aggregation indication information.

Optionally, the frequency layer aggregation capability information includes at least one of: a quantity of aggregated frequency layers, whether frequency layer aggregation is supported, or a receiving filter bandwidth.

Optionally, the frequency layer aggregation indication information includes: indication as to whether the terminal is to perform frequency layer aggregation, a frequency layer aggregation reporting manner, and indication of indexes of frequency layers for aggregation.

Optionally, in case that the positioning configuration information includes the first frequency layer error parameter and the PRS configuration information, the calculating the positioning measurement quantity according to the positioning configuration information includes:

compensating for errors in PRSs of different frequency layers according to the PRS configuration information and the first frequency layer error parameter, to obtain compensated PRSs; and calculating the positioning measurement quantity according to the compensated PRSs.

Optionally, after the receiving the positioning configuration information, the processor 900 is further configured to read the computer program in the memory to implement following steps:

measuring PRSs of different frequency layers that are transmitted by a base station, to obtain measurement results;

obtaining a second frequency layer error parameter of the different frequency layers according to the measurement results; and transmitting the second frequency layer error parameter to the positioning server or the base station.

Optionally, the first frequency layer error parameter or the second frequency layer error parameter includes at least one of: a timing offset, a phase offset, a frequency error, or a power offset between the different frequency layers.

In FIG. 7, a bus architecture may include any number of interconnected buses and bridges, and connects various circuits including one or more processors represented by the processor 900 and memory represented by the memory 920. The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, i.e., a transmitter and a receiver, to allow for communication with various other apparatuses on the transmission medium. These transmission media include wireless channel, wired channel, optic fiber or the like. For different user equipment, the user interface 930 may be an interface capable of externally or internally connecting a required device, and the connected device includes, but is not limited to: a keypad, a display, a speaker, a microphone, a joystick and the like.

The processor 900 is responsible for supervising the bus architecture and normal operation and the memory 920 may store the data being used by the processor 900 during operation.

Optionally, the processor 900 may be a central processing unit (CPU), an application specific integrated circuit (ASIC), a field-programmable gate array (FPGA) or a complex programmable logic device (CPLD). The processor may also adopt a multi-core architecture.

The processor invokes a computer program stored in the memory and implements any one method provided in the embodiments of the present disclosure according to the obtained executable instructions. The processor and the memory may also be arranged physically separately.

It should be noted here that the above-mentioned terminal provided by the embodiments of the present disclosure can implement all the method steps implemented by the above-mentioned embodiment of the method performed by the terminal, and can achieve the same technical effect. Parts and beneficial effects in this embodiment that are the same as those in the method embodiment will not be described in detail here.

Figure 8:
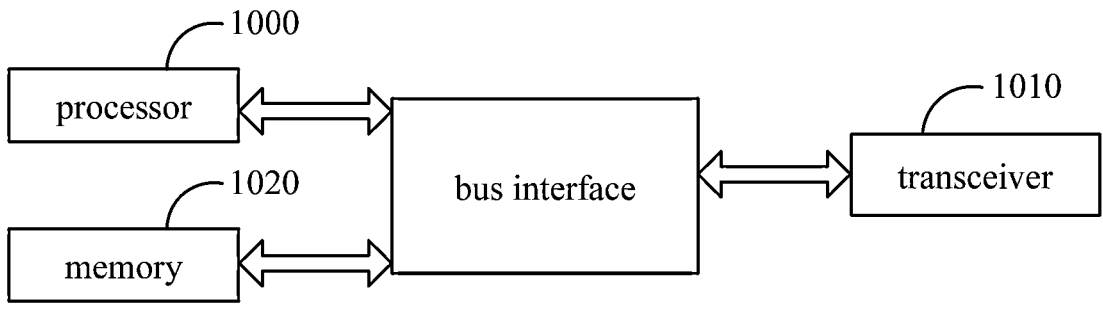
FIG. 8 is a block diagram of a network device applied to a positioning server according to an embodiment of the present disclosure.

An embodiment of the present disclosure further provides a network device, applied to a positioning server. As shown in FIG. 8, the network device includes a memory 1020, a transceiver 1010 and a processor 1000, wherein the memory 1020 is configured to store a computer program, the transceiver 1010 is configured to transmit and receive data under the control of the processor 1000, and the processor 1000 is configured to read the computer program in the memory to implement following steps:

receiving positioning configuration information transmitted by a base station, and transmitting the positioning configuration information to a terminal, wherein the positioning configuration information includes at least one of PRS configuration information or a first frequency layer error parameter;

receiving a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and solving a position of the terminal according to the positioning measurement quantity, to obtain target position information of the terminal.

Optionally, the processor 1000 is further configured to read the computer program in the memory to implement following steps:

receiving frequency layer aggregation capability information transmitted by the terminal; and transmitting frequency layer aggregation indication information to the terminal according to the frequency layer aggregation capability information.

Optionally, the frequency layer aggregation capability information includes at least one of: a quantity of aggregated frequency layers, whether frequency layer aggregation is supported, or a receiving filter bandwidth;

the frequency layer aggregation indication information includes: indication as to whether the terminal is to perform frequency layer aggregation, a frequency layer aggregation reporting manner, and indication of indexes of frequency layers for aggregation.

Optionally, after the transmitting the positioning configuration information to the terminal, the processor 1000 is further configured to read the computer program in the memory to implement following step:

receiving a second frequency layer error parameter of different frequency layers that is transmitted by the terminal or the base station.

Optionally, the solving the position of the terminal according to the positioning measurement quantity to obtain the target position information of the terminal includes:

compensating for errors in the positioning measurement quantity according to the positioning measurement quantity and the second frequency layer error parameter, to obtain compensated positioning measurement quantity; and solving the position of the terminal according to the compensated positioning measurement quantity, to obtain the target position information of the terminal.

Optionally, the first frequency layer error parameter or the second frequency layer error parameter includes at least one of: a timing offset, a phase offset, a frequency error, or a power offset between the different frequency layers.

In FIG. 8, a bus architecture may include any number of interconnected buses and bridges, and connects various circuits including one or more processors represented by the processor 1000 and memory represented by the memory 1020. The bus architecture may also connect various other circuits such as peripherals, voltage regulators and power management circuits, which is well known in the art. Therefore, a detailed description thereof is omitted herein. A bus interface provides an interface. The transceiver 1010 may be multiple elements, i.e., a transmitter and a receiver, to allow for communication with various other apparatuses on the transmission medium. These transmission media include wireless channel, wired channel, optic fiber or the like. The processor 1000 is responsible for supervising the bus architecture and normal operation and the memory 1020 may store the data being used by the processor 1000 during operation.

The processor 1000 may be a central processing unit (CPU), an application specific integrated circuit (ASIC), a field-programmable gate array (FPGA) or a complex programmable logic device (CPLD). The processor may also adopt a multi-core architecture.

It should be noted here that the above-mentioned network device provided by the embodiments of the present disclosure can implement all the method steps implemented by the above-mentioned embodiment of the method performed by the positioning server, and can achieve the same technical effect. Parts and beneficial effects in this embodiment that are the same as those in the method embodiment will not be described in detail here.

An embodiment of the present disclosure further provides a processor readable storage medium storing a computer program, wherein the computer program is configured to be executed by a processor, to implement the aforementioned positioning method.

The processor readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), holographic versatile disc (HVD)), and semiconductor memory (such as ROM, erasable programmable ROM (EPROM), electrically erasable programmable ROM (EEPROM), non-volatile memory (NAND FLASH), solid-state drive (SSD)), etc.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product configured to be implemented on one or more computer-usable storage media (including but not limited to disk storage, optical storage, etc.) storing computer-usable program codes therein.

The present disclosure is described with reference to flowcharts and/or block diagrams of methods, devices (systems), and computer program products according to the embodiments of the disclosure. It will be understood that each process and/or block in the flowcharts and/or block diagrams, and combinations of processes and/or blocks in the flowcharts and/or block diagrams, can be implemented by computer executable instructions. These computer executable instructions may be provided to the processor of a general-purpose computer, special purpose computer, embedded processor or other programmable data processing device to produce a machine, such that the instructions executed by the processor of the computer or other programmable data processing device produce an apparatus for implementing the functions specified in one or more processes in the flowcharts and/or one or more blocks in the block diagrams.

These processor-executable instructions may also be stored in a processor-readable storage capable of directing a computer or other programmable data processing device to operate in a specific manner, such that the instructions stored in the processor-readable storage produce an article of manufacture including instruction means, the instruction means implements the functions specified in one or more processes of the flowchart and/or one or more blocks of the block diagram.

These processor-executable instructions can also be loaded onto a computer or other programmable data processing device, so that a series of operational steps can be performed on the computer or other programmable device to produce a computer-implemented process, the instructions executed on the computer or other programmable devices thus provide steps for realizing the functions specified in one or more processes of the flowchart and/or one or more blocks of the block diagram.

The aforementioned apparatus embodiments are merely illustrative. The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments, which can be understood and implemented by those of ordinary skill in the art without creative efforts.

Various component embodiments of the present disclosure may be implemented by hardware, by a software module executed by one or more processors, or by a combination thereof. It is understood by those skilled in the art that some or all functions of some or all parts of the computing and processing device according to an embodiment of the present disclosure may be implemented by a microprocessor or digital signal processor (DSP) in practice. The present disclosure may also be embodied as a device or apparatus program (e.g., computer program and computer program product) for implementing a part or all of the methods described herein. Such a program for implementing the present disclosure may be stored in a computer readable medium, or may take the form of one or more signals. Such signals may be downloaded from an Internet website, or provided via a carrier signal, or provided in any other form.

Figure 9:
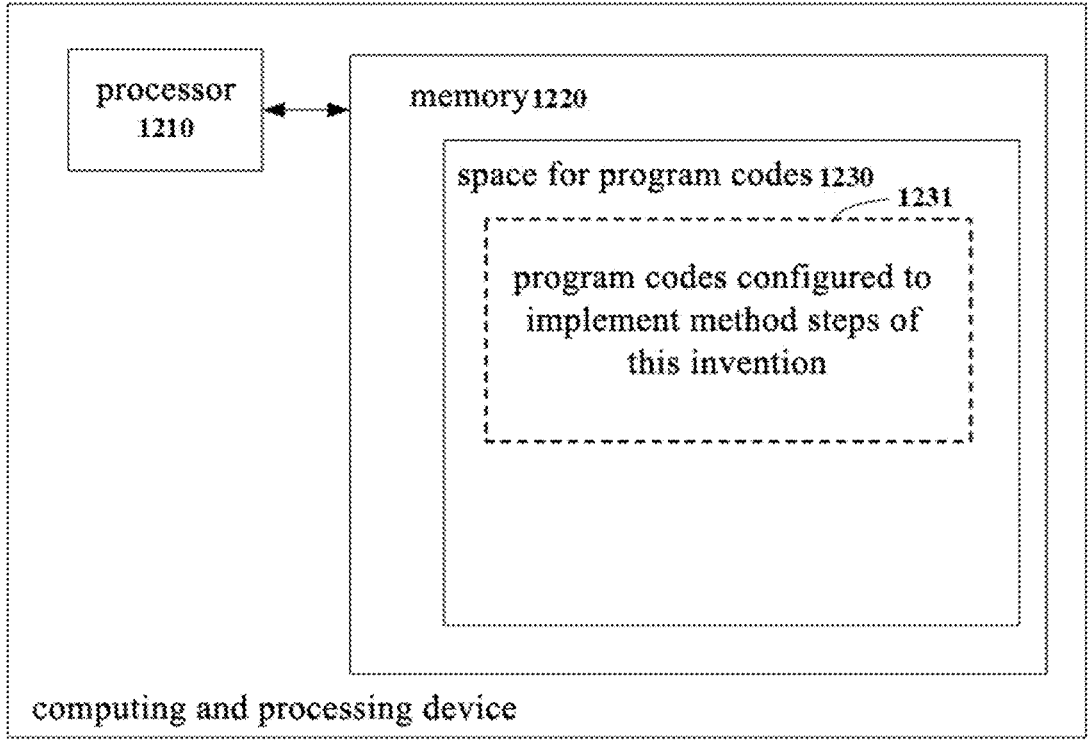
FIG. 9 illustratively shows a block diagram of a computing and processing device for implementing a method according to the present disclosure.
Figure 10:
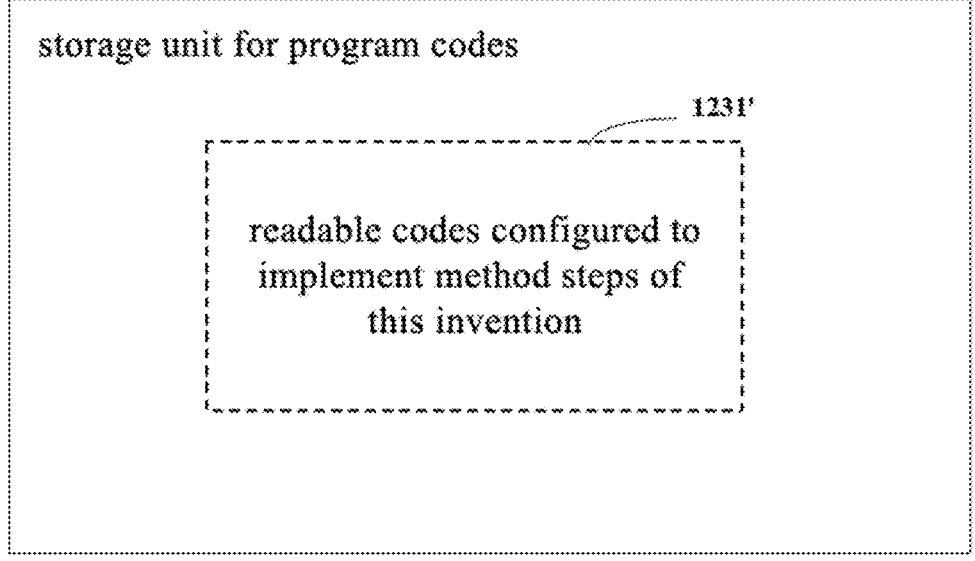
FIG. 10 illustratively shows a storage unit for retaining or carrying program codes configured to implement a method according to the present disclosure.

For example, FIG. 9 shows a computing and processing device configured to implement the method according to the present disclosure. Traditionally, the computing and processing device includes a processor 1210 and a computer program product or computer readable medium in the form of a memory 1220. The memory 1220 may be an electronic storage such as a flash memory, EEPROM, EPROM, hard disk or ROM. The memory 1220 has a storage space 1230 for program codes 1231 configured to implement any method step of the foregoing methods. For example, the storage space 1230 for program codes may include various program codes 1231 configured to implement various steps of the foregoing methods, respectively. These program codes may be read from or written into one or more computer program products. These computer program products include a program code carrier such as a hard disk, CD, memory card or floppy disk. Such a computer program product is generally a portable or stationary storage unit described with reference to FIG. 10. The storage unit may have a storage segment, storage space, etc. arranged similarly to the memory 1220 in the computing and processing device of FIG. 9. Program codes may be for example compressed in a suitable manner. Generally, the storage unit includes computer readable codes 1231', i.e., codes readable by a processor such as 1210. When these codes are executed by a computing and processing device, the computing and processing device implements various steps of the aforementioned methods.

It is understood, "one embodiment", "an embodiment" or "one or more embodiments" mentioned throughout the specification means specific features, structures or characteristics described in relation to the embodiment are included in at least one embodiment of the present disclosure. Additionally, it is noted, instances of "in one embodiment" do not necessarily refer to the same embodiment.

Many details are discussed in the specification provided herein. However, it should be understood that the embodiments of the present disclosure can be implemented without these specific details. In some examples, the existing methods, structures and technologies are not shown in detail so as to avoid an unclear understanding of the description.

Any reference signs placed between parentheses in the claims should not be construed as a limitation on the claims. The expression "comprise" does not exclude elements or steps not present in the claims. The expression "a" or "an" preceding an element does not exclude the present of multiple such elements. The present disclosure may be implemented by a computer including hardware composed of several different elements and programed appropriately. In a unit claim enumerating several apparatuses, some of these apparatuses may be implemented by a single piece of hardware. The terms "first", "second", and "third" are adopted not to describe a specific sequence or order, and can be interpreted as names.

It is noted, the above embodiments are merely used for illustrating the technical solution of the present disclosure, and by no means constitute a limitation. Although the present disclosure has been described in detail with reference to the above embodiments, it is appreciated by those of ordinary skill in the art that modifications or equivalent replacements may be made in the solutions of the described embodiments without departing from the spirit and scope of the solutions of the embodiments of the present disclosure.

What is claimed is:

1. A positioning method, performed by a terminal, comprising:

receiving positioning configuration information, wherein the positioning configuration information comprises positioning reference signal (PRS) configuration information and a first frequency layer error parameter;

calculating a positioning measurement quantity according to the positioning configuration information; and reporting the positioning measurement quantity to a positioning server;

wherein the positioning measurement quantity is reported in the following manner: one positioning measurement quantity is reported for multiple frequency layers of one transmission and reception point (TRP), or one positioning measurement quantity is reported for each frequency layer of one TRP;

wherein the calculating the positioning measurement quantity according to the positioning configuration information comprises:

compensating for errors in PRSs of different frequency layers according to the PRS configuration information and the first frequency layer error parameter, to obtain compensated PRSs; and calculating the positioning measurement quantity according to the compensated PRSs.

2. The positioning method according to claim 1, wherein, prior to the receiving the positioning configuration information, the method further comprises:

transmitting frequency layer aggregation capability information to the positioning server; and receiving frequency layer aggregation indication information transmitted by the positioning server.

3. The positioning method according to claim 2, wherein, after the receiving the frequency layer aggregation indication information transmitted by the positioning server, the reporting the positioning measurement quantity to the positioning server comprises:

reporting the positioning measurement quantity to the positioning server according to the frequency layer aggregation indication information.

4. The positioning method according to claim 2, wherein the frequency layer aggregation capability information comprises at least one of: a quantity of aggregated frequency layers, whether frequency layer aggregation is supported, or a receiving filter bandwidth;

the frequency layer aggregation indication information comprises: indication as to whether the terminal is to perform frequency layer aggregation, a frequency layer aggregation reporting manner, and indication of indexes of frequency layers for aggregation.

5. The positioning method according to claim 1, wherein, after the receiving the positioning configuration information, the method further comprises:

measuring PRSs of different frequency layers that are transmitted by a base station, to obtain measurement results;

obtaining a second frequency layer error parameter of the different frequency layers according to the measurement results; and transmitting the second frequency layer error parameter to the positioning server or the base station.

6. The positioning method according to claim 5, wherein the first frequency layer error parameter or the second frequency layer error parameter comprises at least one of: a timing offset, a phase offset, a frequency error, or a power offset between the different frequency layers.

7. A positioning method, performed by a positioning server, comprising:

receiving positioning configuration information transmitted by a base station, and transmitting the positioning configuration information to a terminal, wherein the positioning configuration information comprises PRS configuration information and a first frequency layer error parameter;

receiving a positioning measurement quantity reported by the terminal, wherein the positioning measurement quantity is reported in the following manner: one positioning measurement quantity is reported by the terminal for multiple frequency layers of one TRP, or one positioning measurement quantity is reported by the terminal for each frequency layer of one TRP; and solving a position of the terminal according to the positioning measurement quantity, to obtain target position information of the terminal;

wherein the positioning measurement quantity is calculated by the terminal according to the positioning configuration information as follows:

compensating for errors in PRSs of different frequency layers according to the PRS configuration information and the first frequency layer error parameter, to obtain compensated PRSs; and calculating the positioning measurement quantity according to the compensated PRSs.

8. The positioning method according to claim 7, further comprising:

receiving frequency layer aggregation capability information transmitted by the terminal; and transmitting frequency layer aggregation indication information to the terminal according to the frequency layer aggregation capability information.

9. The positioning method according to claim 8, wherein the frequency layer aggregation capability information comprises at least one of: a quantity of aggregated frequency layers, whether frequency layer aggregation is supported, or a receiving filter bandwidth;

the frequency layer aggregation indication information comprises: indication as to whether the terminal is to perform frequency layer aggregation, a frequency layer aggregation reporting manner, and indication of indexes of frequency layers for aggregation.

10. The positioning method according to claim 7, wherein, after the transmitting the positioning configuration information to the terminal, the method further comprises:

receiving a second frequency layer error parameter of different frequency layers that is transmitted by the terminal or the base station.

11. The positioning method according to claim 10, wherein the solving the position of the terminal according to the positioning measurement quantity to obtain the target position information of the terminal comprises:

compensating for errors in the positioning measurement quantity according to the positioning measurement quantity and the second frequency layer error parameter, to obtain compensated positioning measurement quantity; and solving the position of the terminal according to the compensated positioning measurement quantity, to obtain the target position information of the terminal.

12. The positioning method according to claim 10, wherein the first frequency layer error parameter or the second frequency layer error parameter comprises at least one of: a timing offset, a phase offset, a frequency error, or a power offset between the different frequency layers.

13. A network device, applied to a positioning server, comprising a memory, a transceiver and a processor, wherein the memory is configured to store a computer program, the transceiver is configured to transmit and receive data under the control of the processor, and the processor is configured to read the computer program in the memory to implement steps of the positioning method according to claim 7.

14. The network device according to claim 13, wherein the processor is further configured to read the computer program in the memory to implement following steps:

receiving frequency layer aggregation capability information transmitted by the terminal; and transmitting frequency layer aggregation indication information to the terminal according to the frequency layer aggregation capability information.

15. A terminal, comprising a memory, a transceiver and a processor, wherein the memory is configured to store a computer program, the transceiver is configured to transmit and receive data under the control of the processor, and the processor is configured to read the computer program in the memory to implement following steps:

receiving positioning configuration information, wherein the positioning configuration information comprises at least one of PRS configuration information or a first frequency layer error parameter;

calculating a positioning measurement quantity according to the positioning configuration information; and reporting the positioning measurement quantity to a positioning server;

wherein the positioning measurement quantity is reported in the following manner: one positioning measurement quantity is reported for multiple frequency layers of one transmission and reception point (TRP), or one positioning measurement quantity is reported for each frequency layer of one TRP;

wherein the calculating the positioning measurement quantity according to the positioning configuration information comprises:

compensating for errors in PRSs of different frequency layers according to the PRS configuration information and the first frequency layer error parameter, to obtain compensated PRSs; and calculating the positioning measurement quantity according to the compensated PRSs.

16. The terminal according to claim 15, wherein, prior to the receiving the positioning configuration information, the processor is further configured to read the computer program in the memory to implement following steps:

transmitting frequency layer aggregation capability information to the positioning server; and receiving frequency layer aggregation indication information transmitted by the positioning server.

17. The terminal according to claim 16, wherein the frequency layer aggregation capability information comprises at least one of: a quantity of aggregated frequency layers, whether frequency layer aggregation is supported, or a receiving filter bandwidth;

the frequency layer aggregation indication information comprises: indication as to whether the terminal is to perform frequency layer aggregation, a frequency layer aggregation reporting manner, and indication of indexes of frequency layers for aggregation.

18. The terminal according to claim 15, wherein, after the receiving the positioning configuration information, the processor is further configured to read the computer program in the memory to implement following steps:

measuring PRSs of different frequency layers that are transmitted by a base station, to obtain measurement results;

obtaining a second frequency layer error parameter of the different frequency layers according to the measurement results; and transmitting the second frequency layer error parameter to the positioning server or the base station.

* * * * *